Dec. 16, 1947.  W. V. HANSON  2,432,755
VEHICLE COOLER
Filed Aug. 12, 1944  2 Sheets-Sheet 1
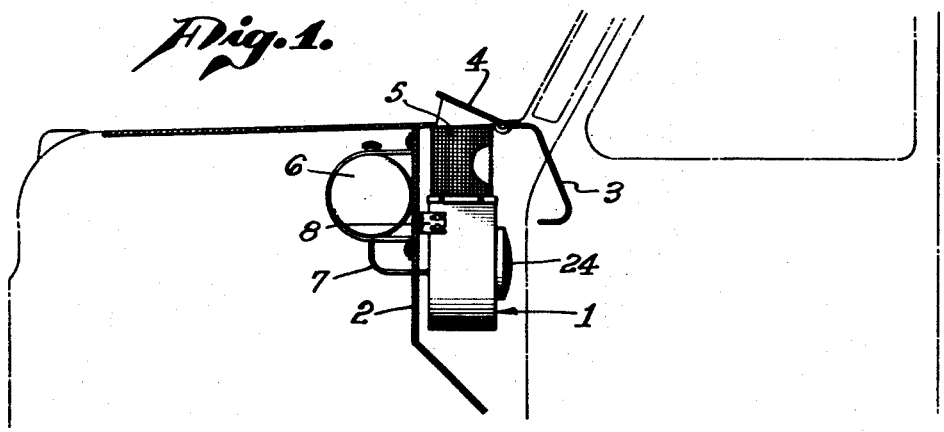
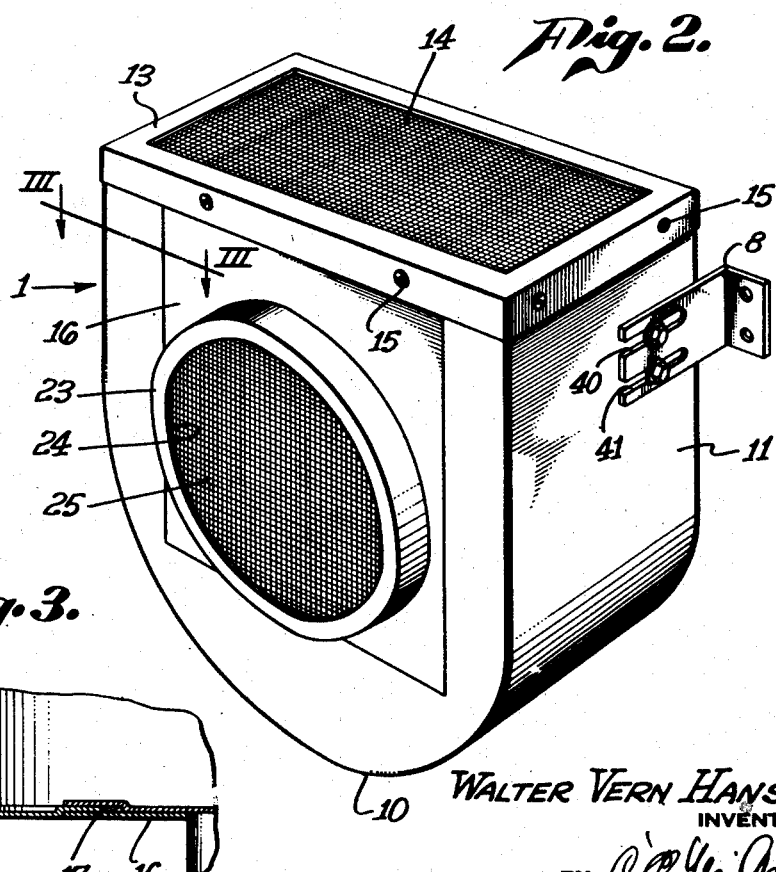
Walter Vern Hanson,
INVENTOR
BY
ATTORNEY.

Dec. 16, 1947. W. V. HANSON 2,432,755
VEHICLE COOLER
Filed Aug. 12, 1944 2 Sheets-Sheet 2

WALTER VERN HANSON,
INVENTOR

BY
ATTORNEY.

Patented Dec. 16, 1947

2,432,755

UNITED STATES PATENT OFFICE 2,432,755

VEHICLE COOLER

Walter Vern Hanson, Los Angeles, Calif., assignor of one-half to William L. Walters, Los Angeles, Calif.

Application August 12, 1944, Serial No. 549,213

6 Claims. (Cl. 261—92)

1

This invention pertains to an air-conditioning and cooling device particularly adapted for use on vehicles such as trailers, passenger cars and the like. The air-conditioning device of the present invention is characterized by its compactness and high efficiency.

Generally stated, the present invention is directed to an air-conditioning unit which obviates the necessity of employing pumps for the circulation or supply of water to the porous, absorptive or evaporative media ordinarily employed in air-cooling or air-conditioning equipment. Moreover, the present invention eliminates the use of spray lines which usually become clogged with solid impurities or with salts derived from the water being handled in the system.

The device, moreover, is so arranged that the packing or settlement of the absorptive or porous pads is eliminated. Heretofore pads or blanks of absorptive media employed in devices of this general class have had a tendency to pack, break down and settle under the continuous vibration of the vehicle on which the devices are mounted so that the efficiency of the device was greatly reduced within a very short period of time. All of the previous difficulties and disadvantages have been obviated by the combination and arrangement of elements contemplated by the present invention.

It is an object of this invention to disclose and provide a compact, efficient air-conditioning device particularly adapted for use on vehicles.

A further object of the invention is to disclose an air-conditioning device of high efficiency which will occupy but very little room and not reduce or intrude upon the utilizable space in such vehicle.

A further object of the invention is to disclose and provide an air-conditioning device in which a single porous evaporative medium is effectively employed.

A still further object of the invention is to disclose and provide an air-conditioning device particularly adapted for use on vehicles, which device is readily assembled and installed.

Other objects and advantages of the present invention will become apparent to those skilled in the art from the following detailed description of a preferred form thereof. In order to facilitate understanding, reference will be had to the appended drawings illustrating a form of the invention.

In the drawings:

Fig. 1 is a diagrammatic representation of a

2 portion of a vehicle showing the manner in which the device may be installed.

Fig. 2 is a perspective three-quarter view of the device.

Fig. 3 is an enlarged section of a portion of the device, the section being taken along the plane III—III of Fig. 2.

Figure 4:
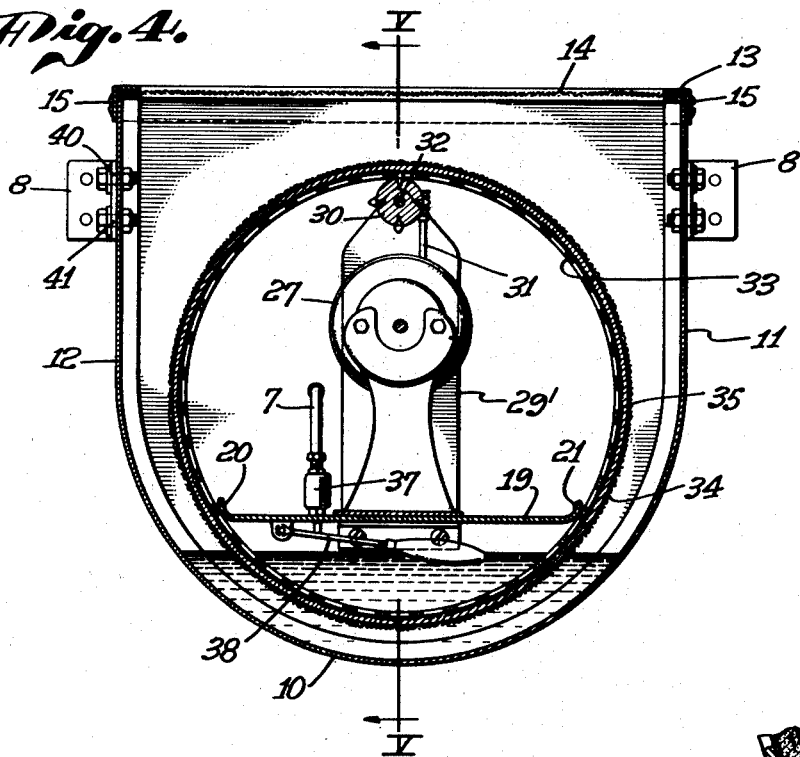
Fig. 4 is a vertical lateral section.

As shown in Fig. 1 the air-conditioning device, generally indicated at 1, may be attached to a bulkhead or dashboard 2 of a vehicle slightly below the instrument panel 3 and in operative relation to an air intake such as, for example, the cowl ventilator 4. The top of the device 1 may be connected to the cowl ventilator 4 by means of a conduit or tubing 5, preferably flexible, such tubing 5 being attached to the top of the device and to the air intake port opened by the cowl ventilator 4. A water supply reservoir such as the tank 6, may be attached to the dashboard or bulkhead 2 in any suitable manner, such reservoir 6 being connected to the device 1 by means of a supply line 7. An adjustable bracket 8 is illustrated as furnishing means for attaching the device 1 to the bulkhead 2.

The air-conditioning device 1 includes a housing provided with a curved bottom portion 10 connecting the sides 11 and 12. The housing is provided with a foraminous top which may be removable. For example, the top may comprise a frame 13 carrying a wire mesh 14. This top may be connected to the housing in any suitable manner as, for example, by means of screws 15.

The front of the housing is shown provided with a removable panel 16 adapted to slidably fit along vertical edge portions 17 of an aperture formed in the front of the housing. The removable panel 16 may be provided with interlocking edges adapted to grip the edge portions 17. It is to be understood that the front panel 16 may be removed after the foraminous top of the device has been removed.

Figure 5:
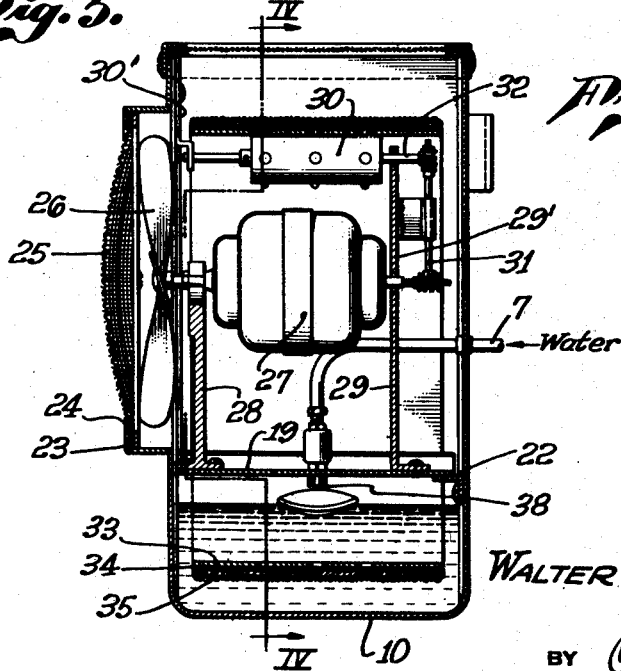
Fig. 5 is a transverse vertical section of the device.

This front panel 16 is provided with a partition 19 adapted to extend horizontally within the lower portion of the housing as best shown in Figs. 4 and 5. The partition 19 is provided with curved end portions 20 and 21 and although these end portions are shown as being curved upwardly, they may be curved downwardly. The rear edge of the partition 19 may come to rest upon a small bracket 22 fastened to the rear wall of the housing.

The front panel 16 is also provided with an air outlet port which, in the form of device shown in the drawings, is composed of a cylindrical ring-like member 23 having the air outlet port 24 formed therein, such air outlet port being guarded by means of a foraminous member or wire screen grate 25.

A blower, such as the fan 26, is mounted upon the partition 19. The blower is substantially of the same diameter as the port 24. The blower is preferably driven by a motor 27, such motor being supported from the partition 19 as by means of brackets 28 and 29 carried by the partition 19. A sprocket roller 30 is also mounted on the partition as, for example, by means of an extension 29' of the bracket 29 and a hanger 30' attached to the inner surface of the removable panel 16. This sprocket roller is located in the upper part of the housing and extends transversely thereof, the bracket extension 29' and the hanger 30' supporting the roller for rotation.

Means are provided for driving the roller from the motor 27 and preferably such means are adapted to reduce the rotational speed of the roller 30. In the example shown the motor shaft is connected by worm and wheel gearing to a vertical shaft 31 mounted in a suitable bearing, the opposite end of such vertical shaft 31 being connected by worm and wheel arrangement with the shaft 32 of the sprocket roller 30.

Figure 6:
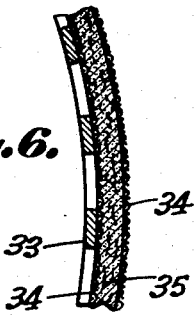
Fig. 6 is an enlarged section through a preferred form of evaporative pad construction.

A cylindrical absorption member is suspended from the roller 30, such absorption member extending below the partition 19 into the bottom of the housing. By referring to Fig. 4 it will be seen that a cylindrical absorption member composed of an inner cylinder 33 of punched or perforated metal or of relatively stiff wire mesh is suspended from the sprocket roller 30 and extends into the bottom curved portion of the housing, the upturned curved ends 20 and 21 of the horizontal partition 19 acting as guides against the inner surface of the cylinder 33. Carried by the outer surface of such cylinder 33 is an absorptive porous pad which may be made by filling a tube of cheesecloth or the like with shavings, excelsior or other porous material and then flattening such tube to form a cylindrical member which is then attached by stitching or otherwise to the outer surface of the foraminous cylinder 33. As more specifically shown in Fig. 6, the exterior cheesecloth tube is indicated at 34 and the filler of excelsior is indicated at 35.

Means are provided for supplying fluid to the bottom of the housing. Such means may comprise the conduit 7 leading from the water reservoir 6 through the rear wall of the housing 1 and extending through the partition 9. A float-actuated valve may be provided for controlling the supply of fluid to the housing. As shown, the valve 37 is controlled by the float-actuated member 38.

The diameter of the air outlet 24 formed in the front of the housing is preferably smaller than the diameter of the absorptive and porous evaporating member 33, the outlet port and said pad member being virtually concentric, by this term reference being made to the fact that the axes of the port and cylindrical absorptive member are parallel. It is also to be noted that the width of the cylindrical evaporative member is such that it extends substantially across the entire width of the housing.

An angularly adjustable bracket is carried on each side of the housing. The bracket 8, illustrated in Fig. 2, is provided with two parallel slots 40 and 41 adapted to engage stud bolts carried by the side 11 of the housing. A bracket of this character permits the housing to be placed in a vertical position even though the bulkhead or partition 2 is inclined.

It has been found desirable to pretreat the absorptive pad carried by the cylindrical member 33 with a solution of a surface tension reducing agent such as triethanolamine oleate or any of the well known surface tension reducing agents such as acid soaps, alcohol derivatives, etc. By saturating a pad with a solution of surface tension reducing agent and then permitting the pad to dry out, the pad will readily absorb water when placed in service subsequently.

From the description given it will be evident that in the event it is desired to place the device in operation the air inlet port, such as the cowl 4, is opened and the motor 27 is started. The motor actuates the blower or fan 26 and at the same time drives the cylindrical absorptive member so as to pass such member through the body of water carried in the bottom of the housing below the partition or splash pan 19. Air is thus passed from the air intake through the conduit 5 and foraminous top 14 through the porous wet pad carried by the cylindrical member 33 and discharged through the air outlet 24. It is to be noted that approximately three-fourths of the cylindrical surface of the pad 33 is exposed to the action of the air and large volumes of air may be effectively humidified and cooled by the device. Since the pad is constantly being rotated and passed through the body of water, its moisture content is maintained at a desired point at all times. As the water level in the bottom of the housing drops, the float valve 38 permits additional water to flow thereinto from the reservoir 6. It is to be noted that spray heads, pumps and other elements formerly employed in air cooling devices have been eliminated and it has been found that in actual practice a device of the character herein disclosed may be used either intermittently or continuously for protracted periods of time without breakdown, stoppage or loss in efficiency.

A specific form of device has been described in detail but it is to be understood that the invention is not limited to the precise form and arrangement of parts herein shown. All changes, modifications and adaptations coming within the scope of the appended claims are embraced thereby.

I claim:

1. An air-conditioning device for vehicles comprising: a housing provided with a curved bottom portion and an air intake; an air outlet port in the front of said housing, a horizontal partition in the lower portion of said housing, said partition having curved end portions adapted to act as guides; a blower mounted on said partition, said blower including a motor; a sprocket roller in the upper part of said housing, means for supporting said roller including a bracket extending upwardly from said partition, means for driving said roller from said motor, and a cylindrical absorption member suspended from said roller in virtually concentric relation to said air outlet port and extending beneath the partition into the bottom portion of the housing, said cylindrical member being guided by the ends of said partition.

2. An air-conditioning device for vehicles comprising: a housing provided with a curved bottom portion and an air intake; an air outlet port in the front of said housing; a horizontal partition in the lower portion of said housing, said partition having curved end portions adapted to act as guides, a blower mounted on said partition in operative relation to the air outlet port, said blower including a motor; a sprocket roller in the upper part of said housing; means for driving said roller from said motor; and a cylindrical absorption member having positive drive connection with and suspended from said roller and guided by the ends of said partition, said absorption member extending below the partition into the bottom of said housing.

3. An air-conditoning device for vehicles comprising: a housing provided with a curved bottom portion and an air intake in the top; an air outlet port in the front of said housing; a horizontal partition in the lower portion of said housing; a blower mounted on said partition, said blower including a motor; a sprocket roller in the upper part of said housing; means for driving said roller from said motor; a cylindrical absorption member suspended from said roller in virtually concentric relation to said air outlet port and extending into the bottom portion of the housing to a point below the partition, edge portions of the partition slidably engaging inner surfaces of the cylindrical member to position the same; conduit means for supplying fluid to the bottom of said housing; and means for regulating supply of fluid through said conduit.

4. An air-conditioning device for vehicles comprising: a housing provided with a curved bottom portion and an air intake in the top; an air outlet port in the front of said housing; a horizontal partition in the lower portion of said housing; a blower mounted on said partition, said blower including a motor; a sprocket roller in the upper part of said housing, means for supporting said roller including a bracket extending upwardly from said partition; speed reduction means for driving said sprocket roller from said motor; a cylindrical absorption member suspended from said roller, said absorption member extending below the partition into the bottom of said housing, edge portions of the partition slidably engaging the inner surfaces of the cylindrical absorption member to position the same; conduit means for supplying fluid to the bottom of said housing; and means for regulating supply of fluid from said conduit.

5. An air-conditioning device comprising: a housing provided with a curved bottom portion, the front of said housing being provided with a removable panel provided with a partition adapted to extend horizontally within the lower portion of the housing, and an air outlet port formed in said panel; a blower mounted on said partition in operative relation to the air outlet port, said blower including a motor; a sprocket roller in the upper part of said housing; and a cylindrical absorption member comprising an inner foraminous cylinder and an outer absorptive porous pad suspended from said roller in virtually concentric relation to said air outlet port and extending into the bottom portion of the housing to a point below the partition, edge portions of the partition slidably engaging the inner foraminous cylinder to position the same.

6. An air-conditioning device for vehicles comprising: a housing provided with a curved bottom portion and an air intake in the top; an air outlet port in the front of said housing; a horizontal partition in the lower portion of said housing; a blower mounted on said partition, said blower including a motor; a sprocket roller in the upper part of said housing; speed reduction means for driving said sprocket roller from said motor; a cylindrical absorption member comprising an inner foraminous cylinder and an outer absorptive porous pad suspended from said roller in virtually concentric relation to said air outlet port and extending into the bottom portion of the housing to a point below the partition, edge portions of the partition slidably engaging he inner foraminous cylinder to position the same; conduit means for supplying fluid to the bottom of the housing; and means for regulating supply of fluid through said conduit.

WALTER VERN HANSON.

REFERENCES CITED

The following references are of record in the file of this patent:

UNITED STATES PATENTS

| Number | Name | Date |
|---|---|---|
| 2,179,470 | Lassen | Nov. 7, 1939 |
| 2,221,003 | Massey | Nov. 12, 1940 |
| 2,232,586 | Alguire | Feb. 18, 1941 |
| 2,289,825 | Burton et al. | July 14, 1942 |
| 2,289,983 | Moseley | July 14, 1942 |